United States Patent [19]

Sugawara et al.

[11] Patent Number: 4,786,998
[45] Date of Patent: Nov. 22, 1988

[54] DISK DRIVING DEVICE

[75] Inventors: Tadami Sugawara; Hiroshi Yoshida; Masao Okita, all of Furukawa, Japan

[73] Assignee: Alps Electric Co., Ltd., Tokyo, Japan

[21] Appl. No.: 929,335

[22] Filed: Nov. 10, 1986

[30] Foreign Application Priority Data

Nov. 8, 1985 [JP] Japan .................. 60-248936

[51] Int. Cl.$^4$ ............................................. G11B 17/04
[52] U.S. Cl. .......................................... 360/97; 360/99
[58] Field of Search .................. 360/97, 99, 98, 96.5, 360/96.6; 369/77.2

[56] References Cited

U.S. PATENT DOCUMENTS

| 4,641,212 | 2/1987 | Yokota et al. | 360/97 |
| 4,646,176 | 2/1987 | Shimaoka et al. | 360/97 |
| 4,656,544 | 4/1987 | Yamanouchi | 360/97 |

Primary Examiner—John H. Wolff
Assistant Examiner—Matthew J. Bussan
Attorney, Agent, or Firm—Guy W. Shoup; Paul J. Winters

[57] ABSTRACT

A disk driving device which receives a disk cartridge accomodating an information recording disk and drives the information recording disk rotatively for recording information in and for reproducing information from the information recording disk, which comprises a holder for holding the disk cartridge received in the disk driving device, springs for biasing the holder toward a turntable for rotatively driving the information recording disk, a lever for securing the disk cartridge to the holder, a sliding plate which travels along a frame moving the disk cartridge vertically toward or away from the turntable, a spring for always biasing the sliding plate toward the disk cartridge receiving side of the device, a locking lever for restraining the sliding plate from moving toward the cartridge receiving side when the holder is raised from the turntable and located at a predetermined position near the cartridge receiving side and for releasing the sliding plate to allow the holder to move horizontally and vertically toward the turntable after the disk cartridge has been secured to the holder by the lever, and holder control lever for shifting the holder in a direction opposite the direction of movement of the sliding plate. The direction of movement of the sliding plate is inverted by the holder control lever to drive the holder, so that the position of the sliding plate and that of the holder can be regulated accurately for reliable automatic loading and ejecting operation.

3 Claims, 23 Drawing Sheets

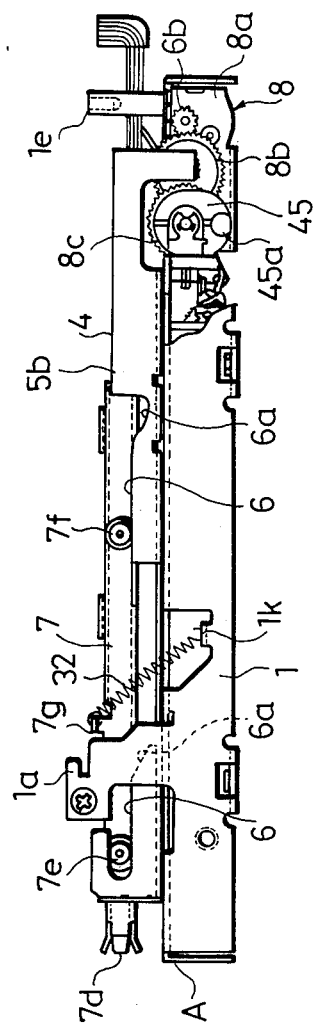
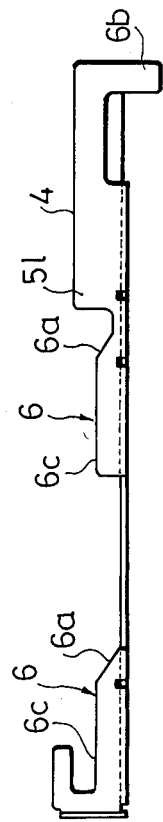
Fig. 6
Fig. 9

Fig. 17
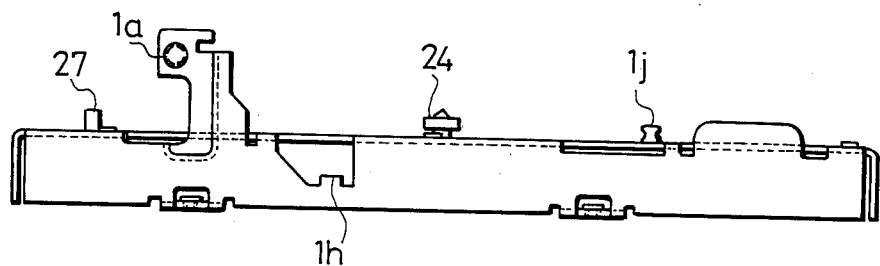
Fig. 18
Fig. 19
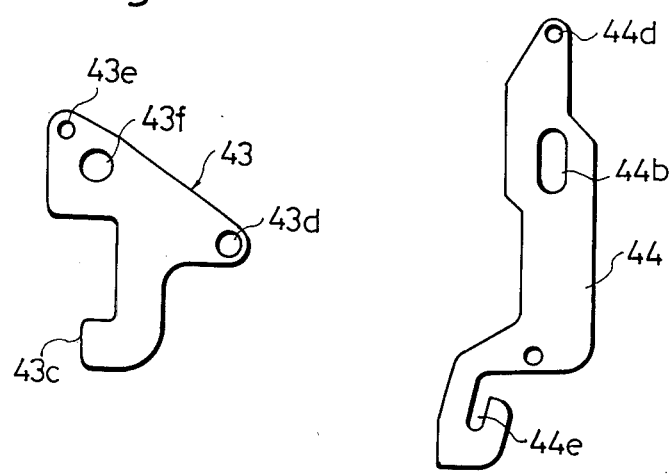

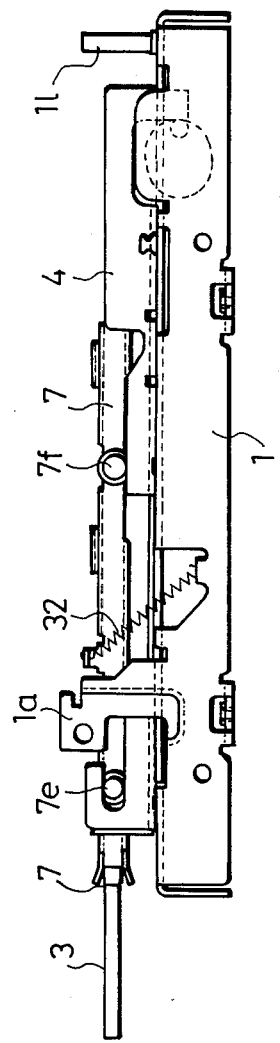
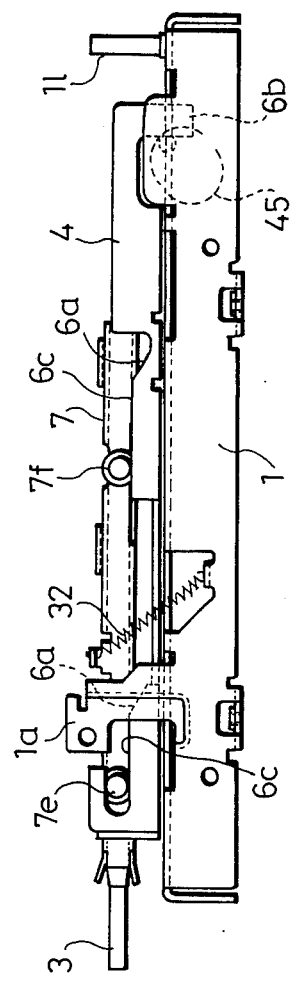

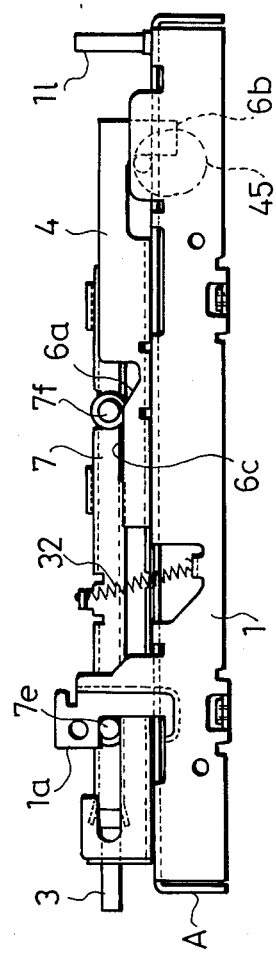
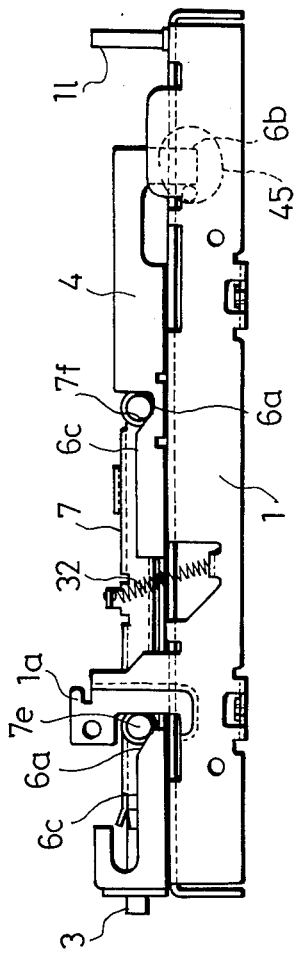
Fig. 27
Fig. 28

DISK DRIVING DEVICE

BACKGROUND OF THE INVENTION

1. Field of the Invention:

The present invention relates to a disk driving device which rotatively drives an information recording medium, as a magnetic disk or an optical disk, for recording or reproducing information and, more specifically, to a disk driving device provided with a mechanism capable of automatic loading and automatic ejection of the information recording medium.

2. Description of the Prior Art:

Among various disk driving devices for recording and reproducing apparatus which record information in and reproduce the information recorded in a disk-shaped information recording medium (hereinafter referred to as "disk"), a disk driving device which holds a disk cartridge (hereinafter referred to as "cartridge"), namely, a hard case made of a synthetic resin and containing a disk therein, on a holder and mounts the disk through the holder on rotative driving means for recording or reproducing handles the disk indirectly through the hard case. Accordingly, various automatic disk loading mechanisms for such a disk driving device have been proposed.

Such a disk driving device is proposed by Utility Model Application No. 60-30849 made by the applicant of the present application. As illustrated in FIG. 34, this proposed disk driving device has an automatic loading-/ejecting mechanism comprising, as principal members, a lever 51 attached to a shaft 50 for swing motion, a slider 53 capable of reciprocating along a guide shaft 52, and a coil spring having one end connected to the lever 51 and the other end connected to the slider 52. More specifically, one end and the other end of the coil spring 54 are attached pivotally to the free end of the lever 51 and to a part of the slider 53, respectively, to interlock the swing motion of the lever 51 and the sliding motion of the slider 53. As illustrated in FIG. 35, the slider 53 is provided with an arm 59 having a pin 59 capable of engaging a recess 57 formed in a cartridge 56. As illustrated in FIG. 36, when the cartridge 56 is inserted into the disk driving device, the pin 58 engages the recess 57 from the lower side of the cartridge 56. After the pin 58 has engaged the recess 57, the slider 52 is allowed to move in a predetermined direction for loading operation.

The cartridge loading operation of this disk driving device uses the resilience and displacement of the coil spring 54. FIG. 37 is a diagrammatic illustration particularly showing the mode of displacement of the coil spring 54 during the cartridge loading operation. Referring to FIG. 37, initially, the coil spring 54 is located at a waiting position indicated by continous lines, and the lever 51 is restrained from swing motion by an ejecting lever 60 (FIG. 35). As the slider 53 is pushed backward, namely, in the direction indicated by arrow X, by the cartridge 56, the coil spring 54 is turned counterclockwise about the spring retaining hole 61 of the lever 51. As the coil spring 54 is turned counterclockwise, the distance between the free ends of the coil spring 54 decreases gradually until the coil spring 54 is turned to a position indicated by broken lines, where the free ends of the coil spring 54 are on a line P perpendicular to direction indicated by arrow X and the resilience of the coil spring 54 is increased to a maximum. The cartridge 56 is pushed into the disk driving device by hand or by mechanial means until the coil spring 54 is turned to the position indicated by broken lines.

While the coil spring 54 is turned from the position indicated by continuous lines to the position indicated by broken lines and the slider 53 is moved in the direction indicated by arrow X, the front end 62 of the arm 59 returns gradually upward along the rising slope 64 of the control member 63 of a holder 67 (FIG. 36) and, finally, the pin 58 projects from the cartridge passage 65 and engages the recess 57, so that the cartridge 56 is connected to the slider 53.

Referring again to FIG. 37, upon the passage of the spring retaining hole 66 of the slider 53 retaining one end of the coil spring 54 across the line P, the free end of the coil spring 54, hence the slider 53, is pushed in the direction indicated by arrow X by the energy stored in the coil spring 54 as indicated by alternate long and two short dashes lines in FIG. 37. Thus, after the spring retaining hole 66 has passed across the line P, the slider 53 is moved by the resilience of the coil spring 54 along a guide groove, not shown, formed in the holder 67 in the direction indicated by arrow X, so that the cartridge 56 is pulled automatically into the disk driving device.

An unlocking projection 68 provided at the rear end of the slider 53 comes into abutment with the lug of a locking lever, not shown, and the cartridge is located right above the rotative driving means before the coil spring 54 arrives at the position indicated by alternate long and two short dashes lines. Then, the cartridge 56 is mounted on the rotative driving means by a mechanism, not shown, for recording or reproducing operation.

After the completion of the recording or reproducing operation, the eject lever 60 is driven by an eccentric cam which is driven by a motor, not shown, to turn the lever 51 so as to move the coil spring 54 and the slider 53 forward for cartridge ejecting operation.

In the above-mentioned cartridge carrying mechanism of the known automatic loading mechanism, the pin 58 attached to the free end of the arm 59 which swings in the direction of the thickness of the cartridge drops into the recess 57 of the cartridge 56 from the lower side of the cartridge 56, and then the slider 53 moves in the direction of arrow X to load the cartridge 56 on the disk driving device, which is undesirable in view of reducing the thickness of the disk driving device. If the cartridge carrying mechanism is designed so that the pin 58 will engage the cartridge 56 on the lateral side, the control member 63 needs to be bent laterally, which is undesirable in respect of the area size of the disk driving device. Furthermore, since the cartridge 56 is moved relative to the holder 67 for loading and ejecting operation, malfunction attributable to the friction between the holder 67 and the cartridge 56 is liable to occur, which deteriorates the reliability of the disk driving device.

SUMMARY OF THE INVENTION

Accordingly, it is an object of the present invention to provide a disk driving device capable of reliable automatic cartridge loading and ejecting operation and having no possibility of malfunction and erroneous operation.

In order to solve the above-mentioned problems, the present invention provides a disk driving device which receives a disk cartridge accommodating a disk-shaped information recording medium and rotatively drives the information recording medium for recording information in and reproducing information from the information recording medium, which comprises: holding means for receiving a cartridge therein and holding the same; biasing means for biasing the holding means toward a turntable for rotatively driving the information recording medium; fixing means for fixing the cartridge in place on the holding means after the insertion of the cartridge into the holding means; sliding means which traverses along a frame and shifts the holding means vertically relative to the turntable; biasing means for always biasing the sliding means toward the cartridge receiving side; locking means for restraining the sliding means from moving toward the cartridge receiving side when the holding means is raised from the turntable and located at a predetermined position near the cartridge receiving side and for releasing the sliding means to allow the holding means to move horizontally and vertically toward the turntable after the cartridge has been secured to the holding means by the fixing means; and holder control means for shifting the holding means in a direction opposite the direction of movement of the sliding means.

The disk driving device thus constructed according to the present invention operates the holding means fixedly holding the cartridge for the automatic loading and ejection of the disk by driving the holding means through the inversion of the moving direction of the sliding means by means of the holder control means. Accordingly, the operation of the holding means and the sliding means in relation to each other ensures the reliable control of the respective positions of the holding means and the sliding means, and thereby reliable automatic loading and ejecting operation is achieved.

The above and other objects, features and advantages of the present invention will become more apparent from the description of the preferred embodiment thereof taken in conjunction with the accompanying drawings.

BRIEF DESCRIPTION OF THE DRAWINGS

FIGS. 1 to 33 are views of assistance in describing a disk driving device, in a preferred embodiment, according to the present invention, in which:

FIGS. 1 to 3 are plan views of the essential portions of the disk driving device, for explaining the manner of operation of the holder control lever;

FIG. 4 is a schematic plan view of the disk driving device;

FIG. 5 is a bottom plan view of the disk driving device;

FIG. 6 is a side elevation of the disk driving device;

FIG. 7 is a plan view of the housing;

FIG. 8 is a plan view of the sliding plate;

FIG. 9 is a right-hand side elevation of the sliding plate;

FIG. 10 is a left-hand side elevation of the sliding plate;

FIG. 11 is a plan view of the holder;

FIG. 12 is a front elevation of the holder;

FIG. 13 is a side elevation of the holder;

FIG. 14 is a plan view of the catching lever;

FIG. 15 is a side elevation of the catching lever;

FIG. 16 is a plan view of the frame;

FIG. 17 is a side elevation of the frame;

FIG. 18 is a plan view of the locking lever;

FIG. 19 is a plan view of the holder control lever;

FIG. 20 is a front elevation of the cam plate;

FIG. 21 is a plan view of the cam plate;

FIG. 22 is a side elevation of the cam plate;

FIG. 23 is a plan view of the damper;

FIG. 24 is a longitudinal sectional view of the damper attached to the bottom plate;

FIGS. 25 to 28 are side elevations of assistance in explaining the disk loading operation of the disk driving device;

FIGS. 29 to 32 are plan views of the essential portions of the disk driving device, of assistance in explaining the disk loading operation of the disk driving device; and FIG. 33 is a bottom plan view of a disk cartridge to be used in combination with the disk driving device; and FIGS. 34 to 37 are views of assistance in explaining a conventional disk driving device, in which:

FIG. 34 is a fragmentary plan view showing the coil spring and the associated components;

FIG. 35 is a plan view of the sliding member;

FIG. 36 is schematic view of assistance in explaining the movement of the sliding member; and FIG. 37 is a diagrammatic illustration of assistance in explaining the action of the coil spring during the automatic loading operation.

DESCRIPTION OF THE PREFERRED EMBODIMENT

Figure 1:
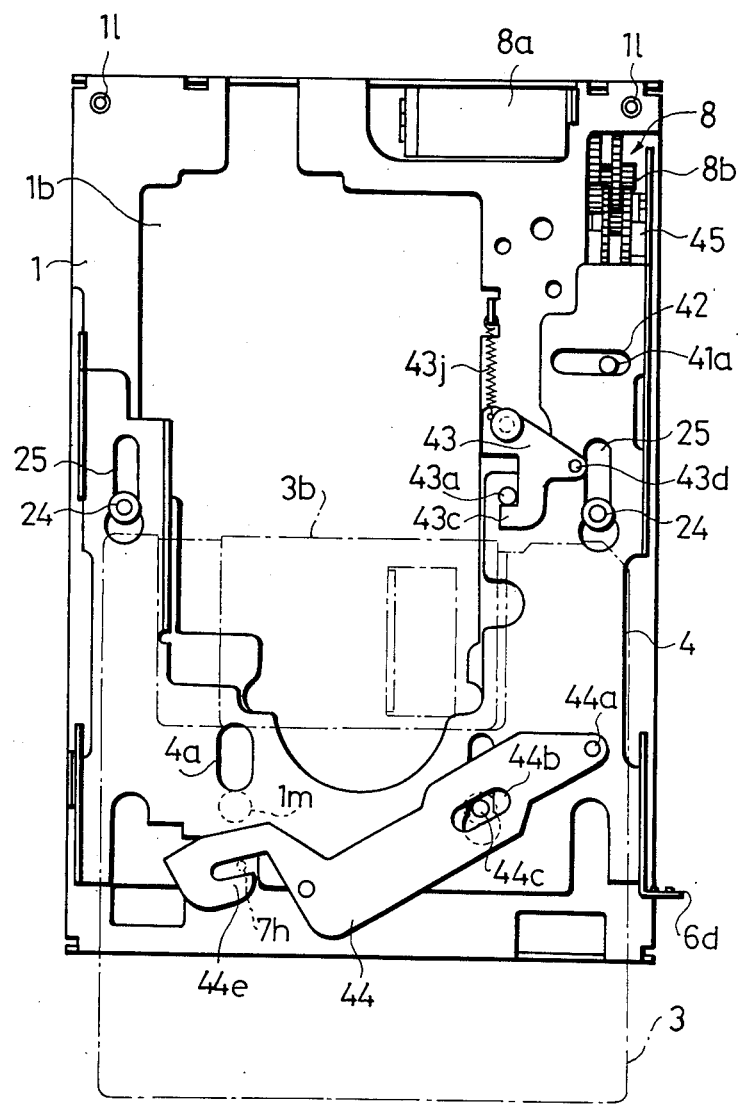

General Constitution:

The general constitution of a disk driving device equipped with an automatic loading mechanism according to the present invention will be described with reference to FIGS. 4 to 7.

The disk driving device embodying the present invention comprises a frame 1, a housing 2 inserted into the interior of the frame 1 through the bottom of the same and fixedly disposed in place in the frame 1, a sliding plate 4 slidably mounted on the upper surface in the front section of the frame 1, a holder 7 which engages a cam section 6 of the side wall 5a of the sliding plate 4 to hold a disk cartridge 3, a turntable 9 for rotating a disk 11, a motor 10 disposed below the turn table 9 on the bottom surface of the housing 2 to drive the turntable 9, a carriage 12 placed on the upper surface of the housing 2 so as to be moved in the radial direction of the disk 11, a stepping motor 13, a carriage moving mechanism 14 driven by the stepping motor 13 for moving the carriage 12, and an automatic ejecting mechanism 8 having a manual cartridge ejecting function for manually ejecting the cartridge 3.

Figure 7:
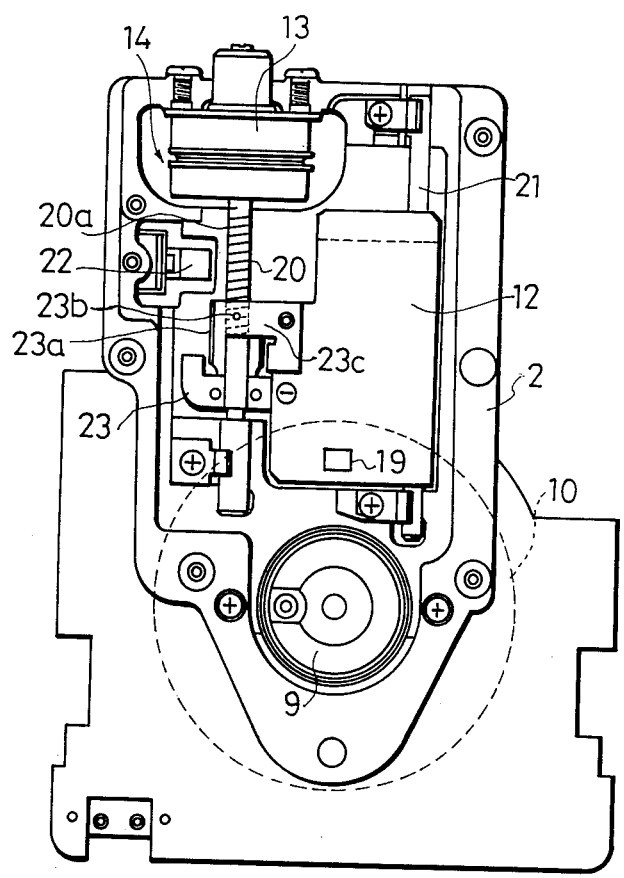

Referring to FIG. 7, the housing 2 formed separately from the frame 1 is mounted with the motor 10 fixedly holding the turntable 9 on the output shaft thereof, the stepping motor 13 for rotatively driving a screw shaft 20 having a thread 20a for driving the carriage 12, the carriage 12 having one side engaging the screw shaft 20 and the other side supported on a guide bar 21 for sliding motion along the guide bar 21, and a zero track sensor 22 for detecting the arrival of a magnetic head 19 disposed at the front end of the carriage 12 at a position corresponding to the zero track of the disk 11. An interlocking gadget 23 provided on one side of the carriage 12 to interlock the carriage 12 with the screw shaft 20 comprises a slide 23b provided at the extremity of a spring plate 23a so as to engage the thread 20a of the screw shaft 20, and a holding member 23c disposed opposite the slide 23b with respect to the screw shaft 20. The vertical position of the carriage 12 is decided by the engagement of the interlocking gadget 23 and the screw shaft 20. The screw shaft 20 for driving the carriage 12, the stepping motor 13 and the interlocking gadget 23 constitute the carriage moving mechanism 14.

Figure 4:
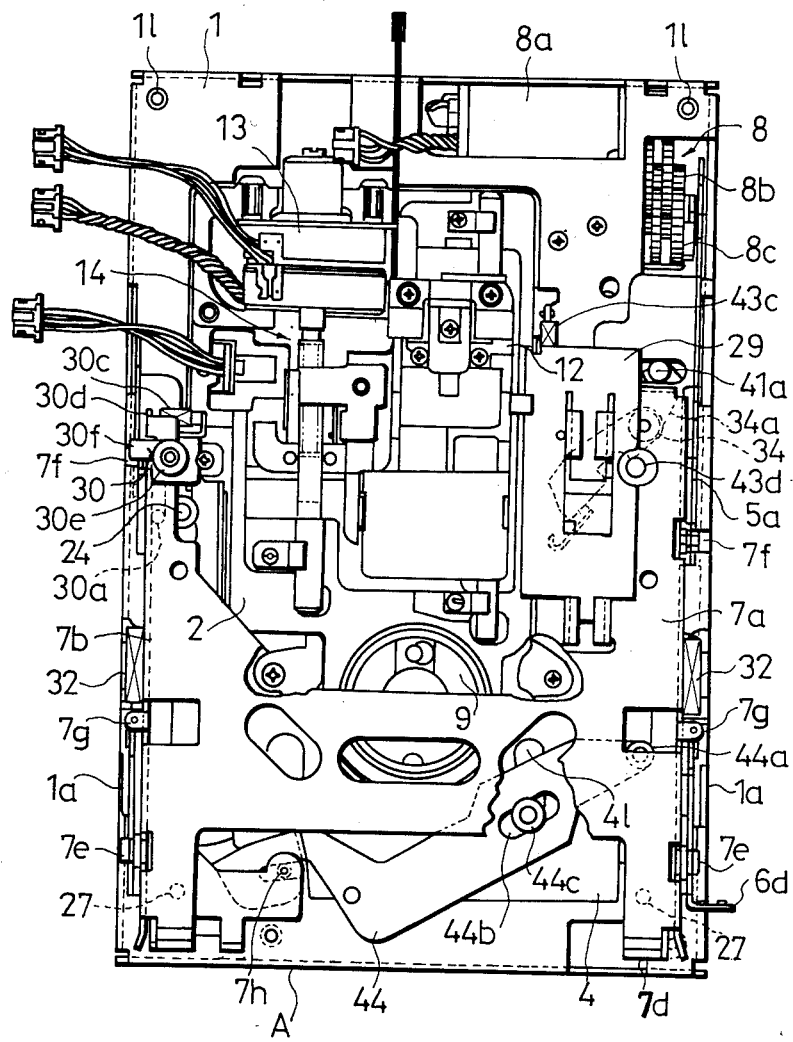
Figure 5:
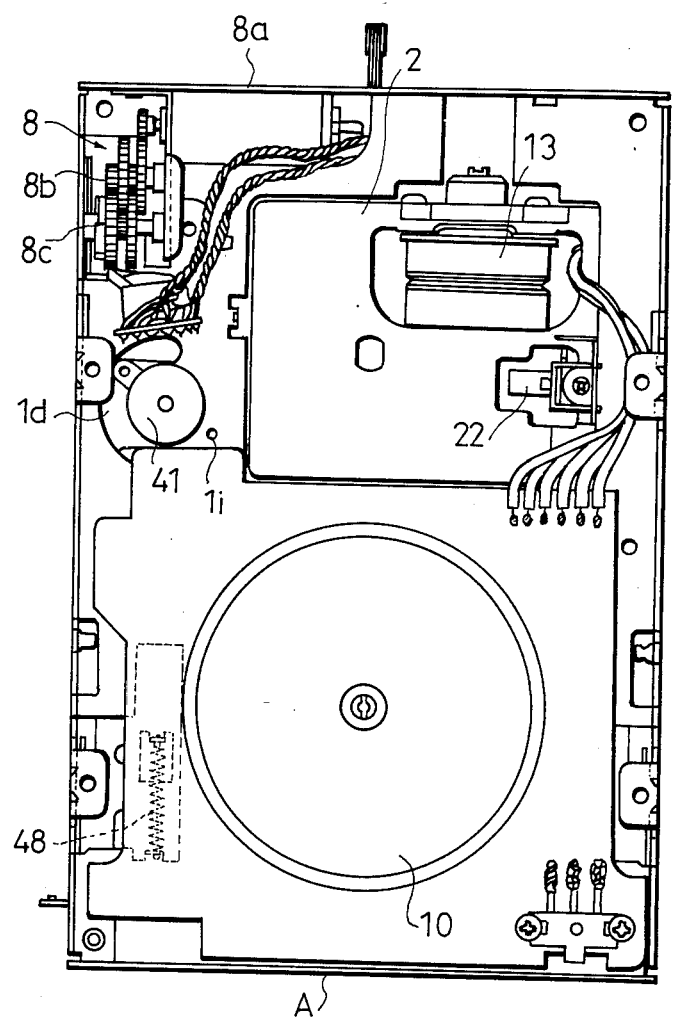
Figure 8:
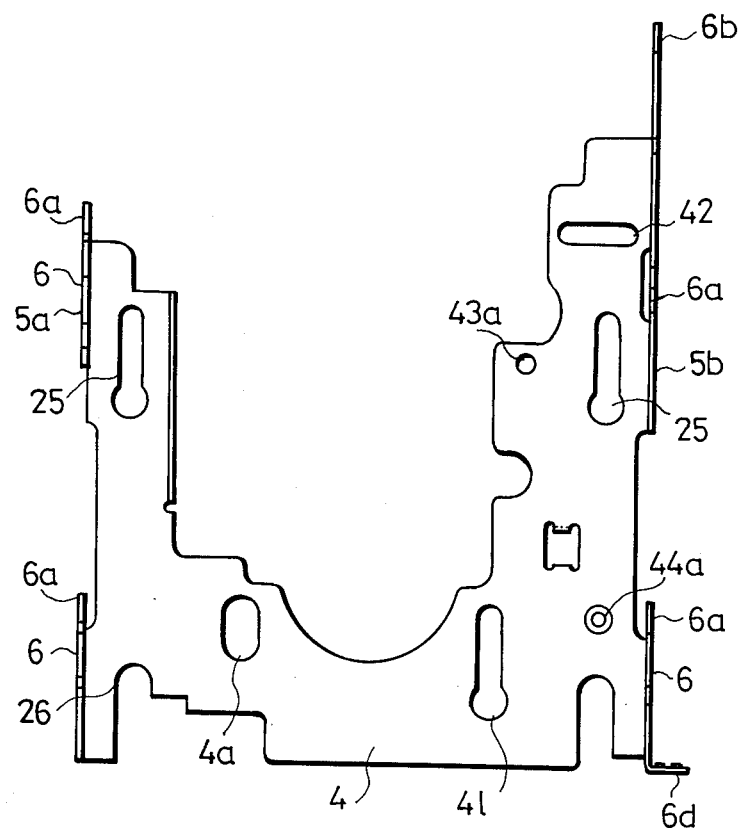
Figure 10:
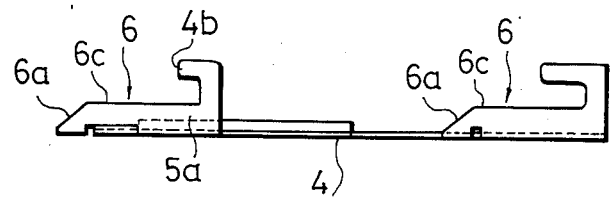

Referring to FIGS. 4, 5 and 6, the sliding plate 4 is slidably mounted on the upper surface of the cartridge receiving side A of the frame 1 and is always biased toward the cartridge receiving side A by a spring having one end connected to the lower surface of the frame 1 and the other end connected to the sliding plate 4. As shown in FIGS. 8, 9 and 10, guide slots 25 for receiving positioning pins 24 fixed to the upper surface of the frame 1 and a slot 42 for receiving the actuator 41a of a damper 41 for regulating the moving speed of the sliding plate 4 are formed in the rear side (hereinafter the cartridge receiving side will be referred to as "front side" and the side where the stepping motor 13 is located will be referred to as "rear side") of the sliding plate 4. A projection 43a with which a locking lever 43 for restraining the sliding plate 4 from forward movement engages is provided in the rear side of the sliding plate 4. A pivot shaft 44a for pivotally supporting a holder control lever 44 for controlling the traverse motion of the holder 7, a slot 4l for receiving a pin for turning the holder control lever 44 on the pivot shaft 44a, a slot 4a for receiving a projection 7h projecting downward from the lower surface of the holder 7 and recesses 26 for guiding pins 27 fixed to the upper surface of the frame 1 for defining the level of the cartridge 3 relative to the upper surface of the frame 1 are provided in the front side of the sliding plate 4. The sliding plate 4 is restrained from lateral movement by the positioning pins 24 and the upward side plate 1a of the frame 1 and is able to move forward and backward.

As illustrated in FIGS. 8 and 9, cam surfaces 6 along which rollers 7e and 7f attached to the side walls of the holder 7 roll are formed in the side walls 5a and 5b of the sliding plate 4. Each cam surface 6 consists of a front section in the form of a straight cam surface 6c extending in parallel to the upper surface of the frame 1 and a rear section in the form of a slope cam surface 6a declining rearward. A projection 6b for automatic ejection is formed at the rear end of the right-hand side wall 5b of the sliding plate 4.

Figure 11:
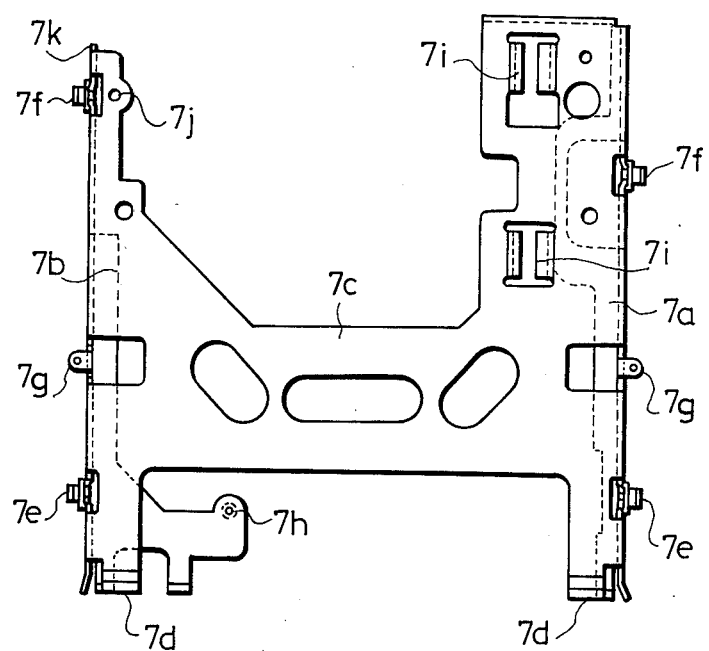
Figure 12:
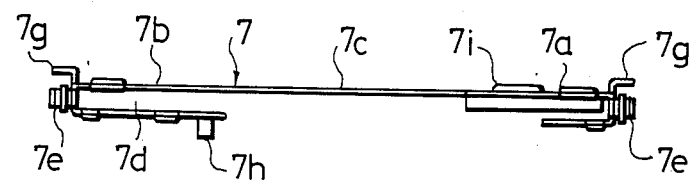
Figure 13:
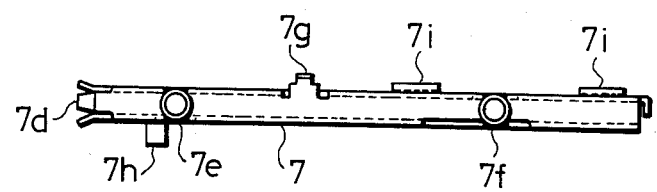
Figure 14:
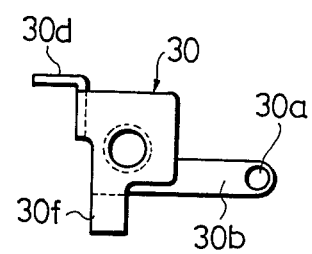
Figure 15:
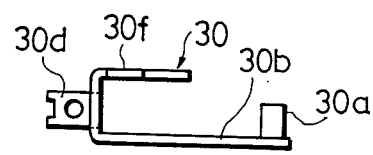

Referring to FIGS. 11, 12 and 13, the holder 7 for holding the cartridge 3 is formed of a thin elastic plate in an integral member comprising a central part 7c and U-shaped cartridge holding parts 7a and 7b formed on the opposite sides of the central part 7c, respectively. A cartridge inlet 7d is formed in the front end of the holder 7. The rollers 7e and 7f which roll along the cam surfaces 6 are attached to the side walls of the cartridge holding parts 7a and 7b. Projections 7g to be connected to springs 32 for biasing the holder 7 toward the turntable 9 are formed in the side walls of the cartridge holding parts 7a and 7b, respectively. Holes 7i are formed in the rear portion of the right-hand cartridge holding part 7a of the holder 7. A plate-shaped supporting member 29 for vertically moving a holding case 12a holding an upper magnetic head relative to the carriage 12 is inserted from the rear side into the holes 7i. A projection 7h which engages the hook 44e of the holder control lever 44 projects downward from the lower surface of the left-hand cartridge holding part 7b near the cartridge inlet 7d of the holder 7. A hole 7j for attaching a lever 30 as shown in FIGS. 14 and 15 is formed in the rear end of the left-hand cartridge holding part 7b.

The lever 30 has an arm 30b provided with a projection 30a which engages a recess 3a formed in the lower surface of the cartridge 3 so as to open in the side surface of the same, and a lug 30d to be connected to a spring 30c. The lever 30 is attached pivotally on a pivot shaft 30e attached to the hole 7j of the holder 7. The spring 30c is extended between the rear end 7k of the left-hand cartridge holding part 7b of the holder 7 and the lug 30d to bias the lug 30d toward the side surface of the cartridge holding part 7b so that the projection 30a of the arm 30b is always located inside the holder 7. A projection 30f is formed in the upper wall of the lever 30. A projection 4b formed in the rear side of the left-hand side wall 5a of the sliding plate 4 comes into abutment with and pushes the projection 30f to turn the lever 30 on the pivot shaft 30e so that the arm 30b of the lever 30 is turned outside the holder 7.

Figure 16:
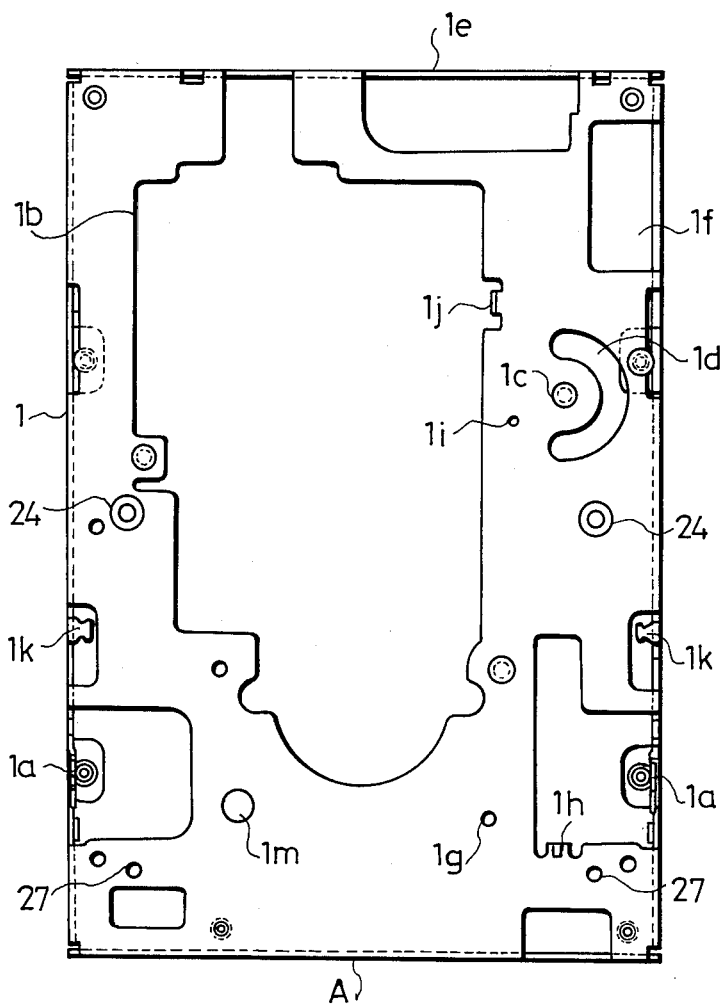

The frame 1 supports the sliding plate 4 slidably in the upper side thereof and holds the housing 2 in the lower side thereof. As illustrated in FIGS. 16 and 17, the frame 1 has an opening 1b for the housing 2, a hole 1c for receiving a screw for fastening the damper 41 to the frame 1, a guide slot 1d for receiving the actuator 41a of the damper 41 therethrough so that the actuator 41a will project from the upper surface of the frame 1, an opening 1e for a motor 8a for driving an ejecting mechanism 8, an opening 1f for a gear train 8b to be driven by the motor 8a, a hole 1g for attaching a pivot shaft 44c of the holder control lever 44, and a projection 1h to be connected to a spring 48 for always biasing the sliding plate 4 toward the front side of the frame 1. A top cover, not shown, is attached to the side walls of the frame 1. Side legs 1a serving as guides for the sliding motion of the sliding plate 4 project upward from the side walls of the frame 1, respectively. A hole 1i for receiving a pivot shaft 43b for pivotally supporting the locking lever 43 as illustrated in FIG. 18 for locking the sliding plate 4, and a projection 1j to be connected to a spring 43j for biasing the locking lever clockwise, as viewed in FIG. 16 are provided in the upper surface of the frame 1. Lugs 1k to be connected to springs 32 for biasing the holder 7 toward the turntable 9 are formed behind the side legs 1a, respectively. Thre springs 32 are extended between the projections 7g of the holder 7 and the lugs 1k, respectively. The positioning pins 24 for positioning the cartridge 3 for recording or reproducing operation are fixed to the frame 1 in the opposite sides of the central portion of the frame 1, respectively, so as to project upward from the upper surface of the frame 1. The pins 27 for defining the vertical position of the cartridge 3 relative to the frame 1 are fixed in the front side of the frame 1. A hole 1m for receiving the projection 7h of the holder therethrough are formed in the frame 1 at a position corresponding to the slot 4a of the sliding plate 4.

As illustrated in FIG. 18, the locking lever 43 has a projection 43c to engage the projection 43a of the sliding plate 4, and a projection 43d to come into abutment with the front end 3c of the cartridge 3 when the same is inserted into the holder 7. When inserted into the holder 7, the cartridge 3 pushes the locking lever 43 at the projection 43d to turn the locking lever 43 counterclockwise so that the projection 43c is disengaged from the projection 43b. The spring 43j is connected to a hole 43e. The pivot shaft 43b is fitted in a hole 43f.

The holder control lever 44 is pivotally supported on the pivot shaft 44a attached to the right-hand side, as viewed in FIG. 8, of the sliding plate 4. As illustrated in FIG. 19, the holder control lever 44 has a hole 44d for receiving the pivot shaft 44a at the base end thereof, the hook 44e formed in the free end thereof so as to engage the projection 7h of the holder 7 through a predetermined angular range of turning of the holder control lever 44. A guide slot 44b for receiving the pivot shaft 44c therethrough to turn the holder control lever 44 as the sliding plate 4 moves.

Figure 20:
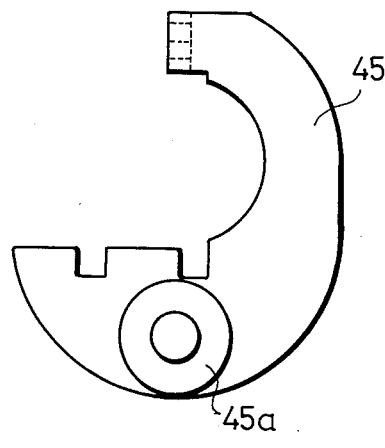
Figure 22:
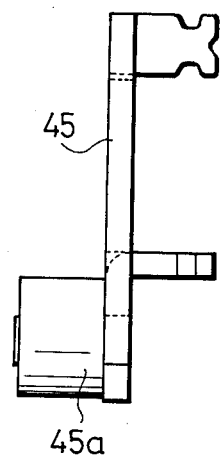
Figure 21:
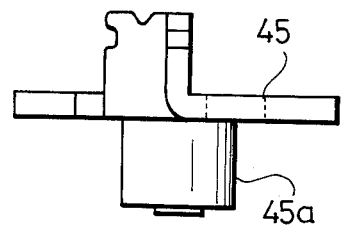

The motor 8e attached to the frame 1 in the opening 1e formed in the rear end of the frame 1 drives the gear train 8b provided in the opening 1f rotatively according to a predetermined ejection signal. A cam plate 45 as shown in FIGS. 20, 21, and 22 is attached to the side surface of the final gear 8c of the gear train 8b with a roller 45a attached thereto opposite the side plate of the frame 1. The roller 45a engages the inner side of the projection 6b formed at the rear end of the sliding plate 4 to move the sliding plate 4 horizotally rearward as the cam plate 45 is rotated.

Figure 23:
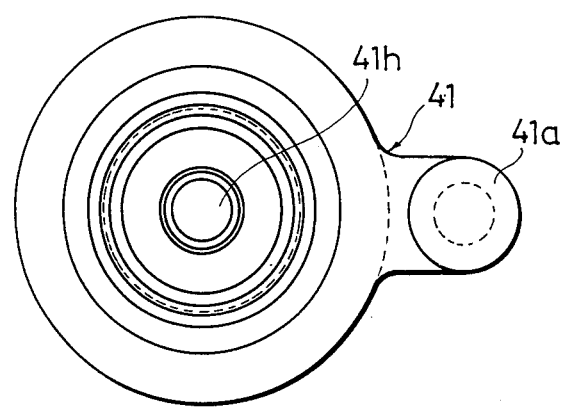
Figure 24:
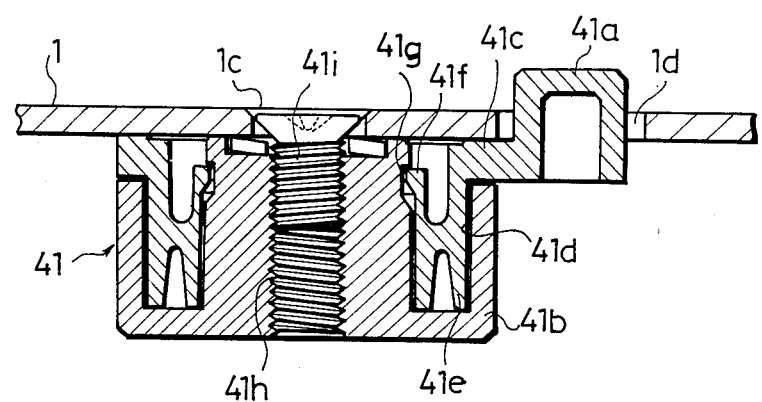

As illustrated in FIGS. 23 and 24, the damper 41 attached to the lower surface of the frame 1. The damper 41 consists of a case 41b and an actuator 41c. A fixed quantity of damping oil, as silicon oil, having a predetermined viscosity is contained in the annular groove 41d of the case 41b and the annular projection 41e of the actuator 41c is fitted in the annular groove 41d of the case 41b. In fitting the annular projection 41e into the annular groove 41d of the case 41b, an annular protrusion 41f formed in the inner circumference of the annular projection 41e is forced to snap over the upper end of the boss of the case 41b into an annular groove 41g formed in the boss to connect the actuator 41c unseparably to the case 41b. The damping oil filling the space between the wall surfaces of the annular groove 41d and the annular projection 41e of the actuator 41c acts as resistance against the turning motion of the actuator 41c caused by torque applied to the projection 41a of the actuator 41c to retard the movement of the projection 41a. A bolt 41i is inserted through an opening formed in the frame 1 from the upper surface of the same and is screwed into the central threaded hole 41h of the case 41b to fasten the case 41b to the frame 1. The projection 41a projects upward through the guide slot 1d. The damper 41 of this construction can be easily assembled and has sufficient effective area to be exposed to the damping action of the damping oil, and hence, the damper 41, although small in size, is capable of sufficient damping action.

The holder 7 is provided with a cartridge ejecting plate 34 which opens the shutter 3b of the cartridge when the cartridge 3 is inserted into the holder 7 and simultaneously closes the shutter 3b and ejects the cartridge 3. A metallic top cover, not shown, for protecting the internal mechanisms and for electrical shielding is attached to the side legs 1a and the supports 1l of the frame 1 to cover the upper part of the frame 1.

Automatic Loading Operation:

The manner of automatic loading operation of the disk driving device thus constructed will be described hereinafter.

Figure 29:
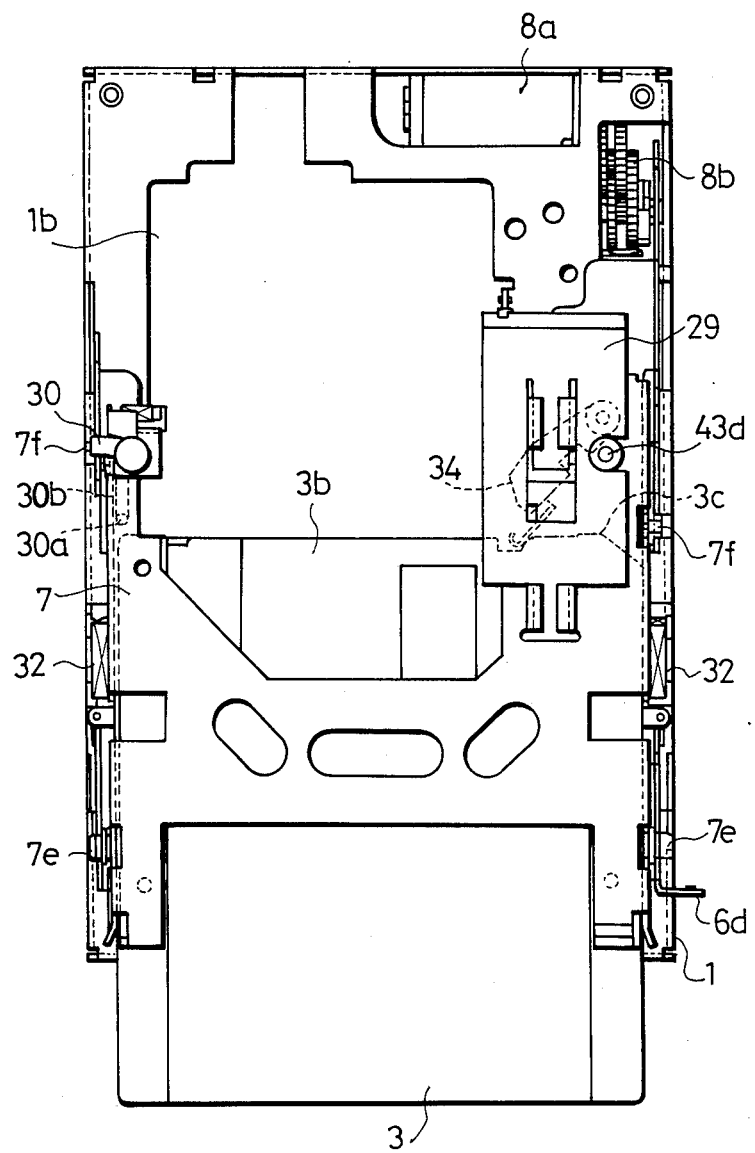
Figure 30:
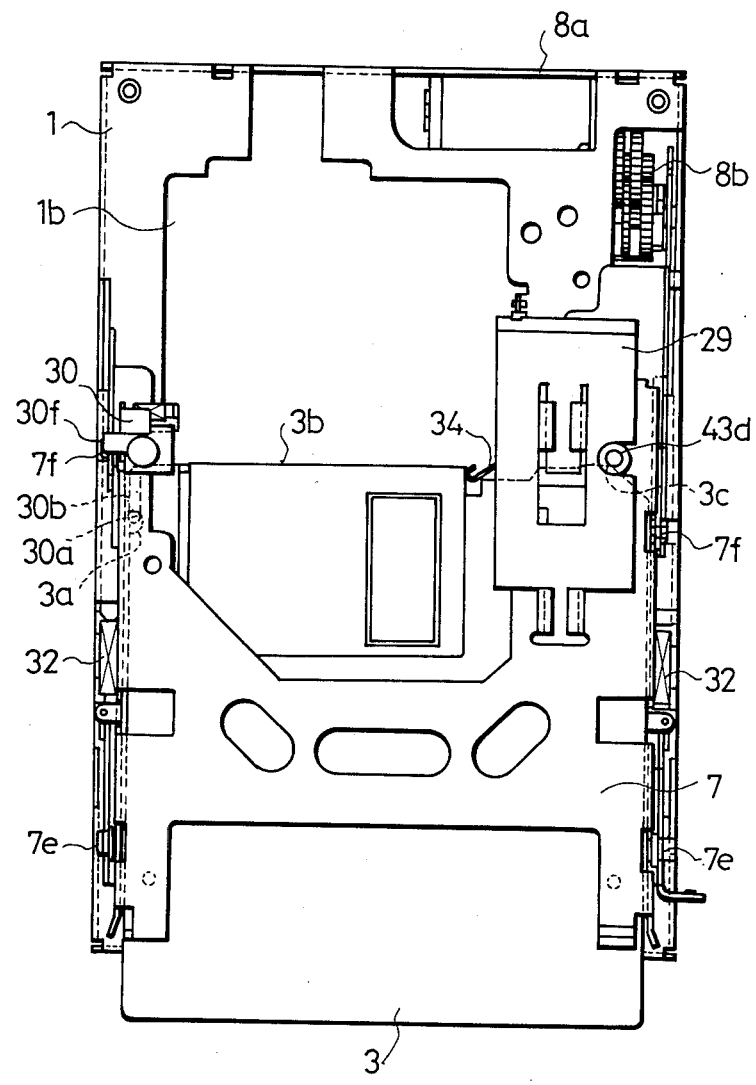

First, referring to FIGS. 25 to 33, the cartridge 3 is inserted through the cartridge inlet 7d into the cartridge driving device as far as the shutter opening groove 3e formed in the front end 3c of the cartridge 3 (FIG. 33) comes into abutment with the extremity of the cartridge ejecting plate 34. Then, the cartridge 3 is pushed further against the resilience of the spring 34a biasing the cartridge ejecting plate 34, and thereby the extremity of the cartridge ejecting plate 34 contacts the side surface of the shutter 3b of the cartridge 3 being turned on its pivot to open the shutter 3b. During this shutter opening operation, a corner 3g of one side of the cartridge 3 comes into abutment with the projection 30a of the lever 30 and turns the lever 30 clockwise against the resilience of the spring 30c extended between the lug 30d and the rear end 7k of the holder 7, so that the projection 30a is brought into sliding contact with the side surface 3h of the cartridge 3 as indicated by alternate long and short dash lines in FIG. 30. As illustrated in FIGS. 26 and 30, upon the arrival of the cartridge 3 at the innermost position in the holder 7, the shutter 3b is fully opened and, at the same time, the projection 30a of the lever 30 drops into the recess 3a of the cartridge 3 to hold the cartridge 3 securely on the holder 7 by the agency of the resilience of the spring 30c. In this state, the front end 3c of the cartridge 3 is located immediately before the projection 43d of the locking lever 43.

While the cartridge 3 is being inserted into the disk driving device, the sliding plate 4 is locked at the rearmost position by the locking lever 43 engaging the projection 43a of the sliding plate 4, and the pivot shaft 44a on which the holder control lever 44 is supported pivotally is located at the rearmost position, as shown in FIG. 1, and hence the hook 44e formed at the free end of the holder control lever 44 is located at the foremost position. In this state, the projection 7h projecting downward from the lower surface of the holder 7 is in engagement with the hook 44e to position the holder 7 in place. Although the U-shaped hook 44e is formed in the free end of the holder control lever 44 in this embodiment to regulate both the forward and rearward movements of the holder 7, the free end of the holder control lever 44 may be formed so as to be in contact with the rear side of the projection 7h to regulate only the rearward movement of the holder 7. Thus, the holder is locked, together with the sliding plate 4, at the foremost position by the holder control lever 44.

Figure 2:
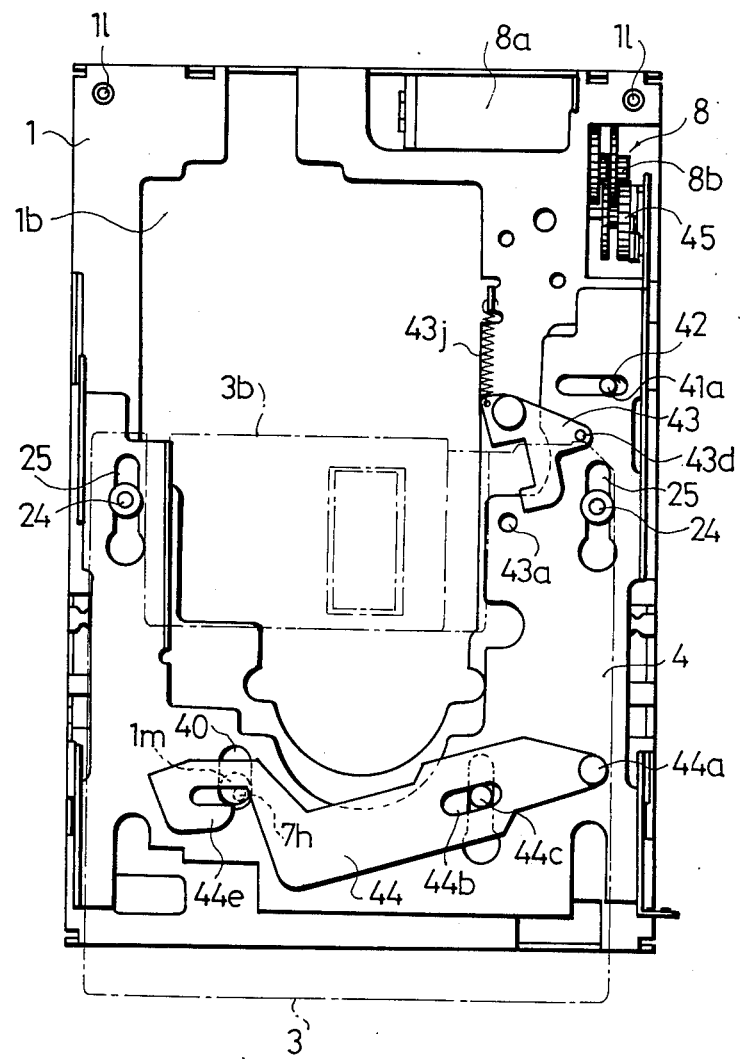
Figure 3:
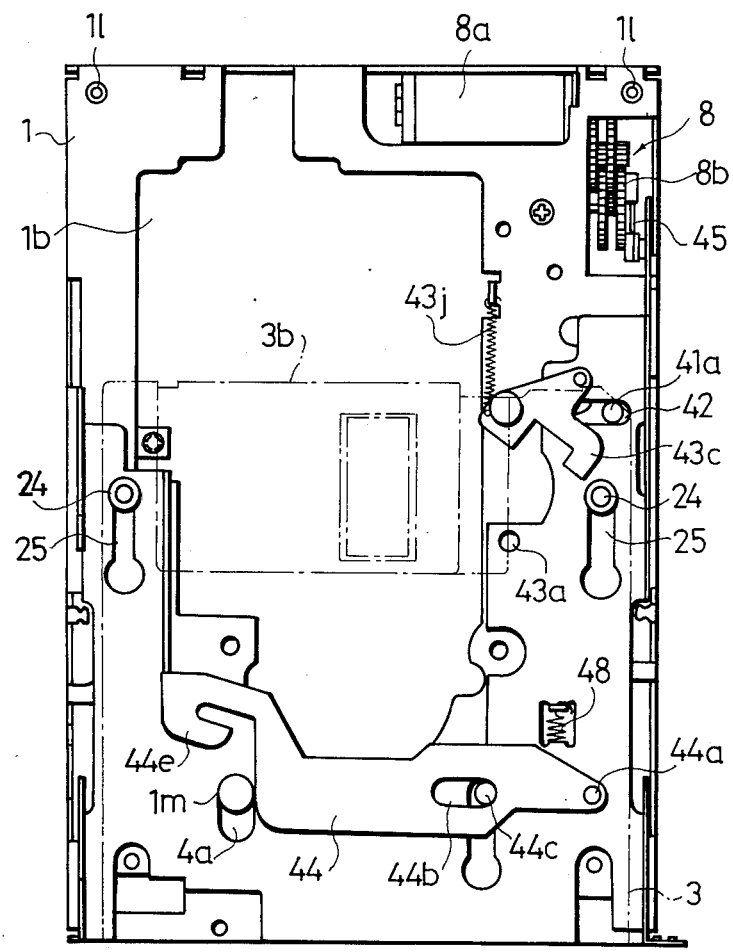
Figure 31:
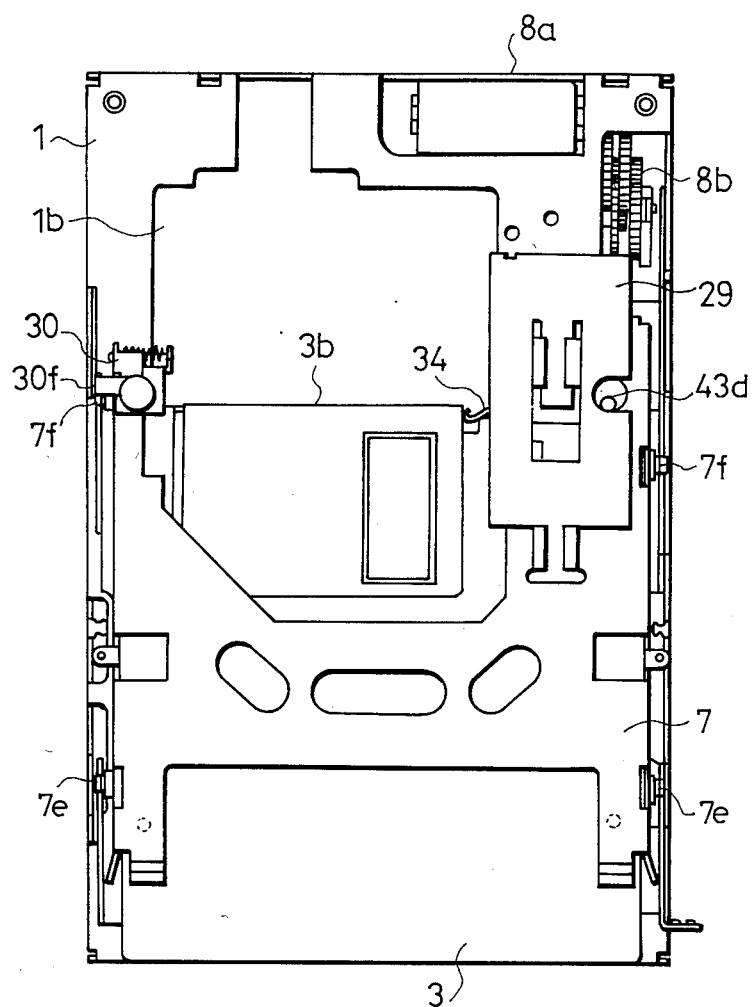
Figure 32:
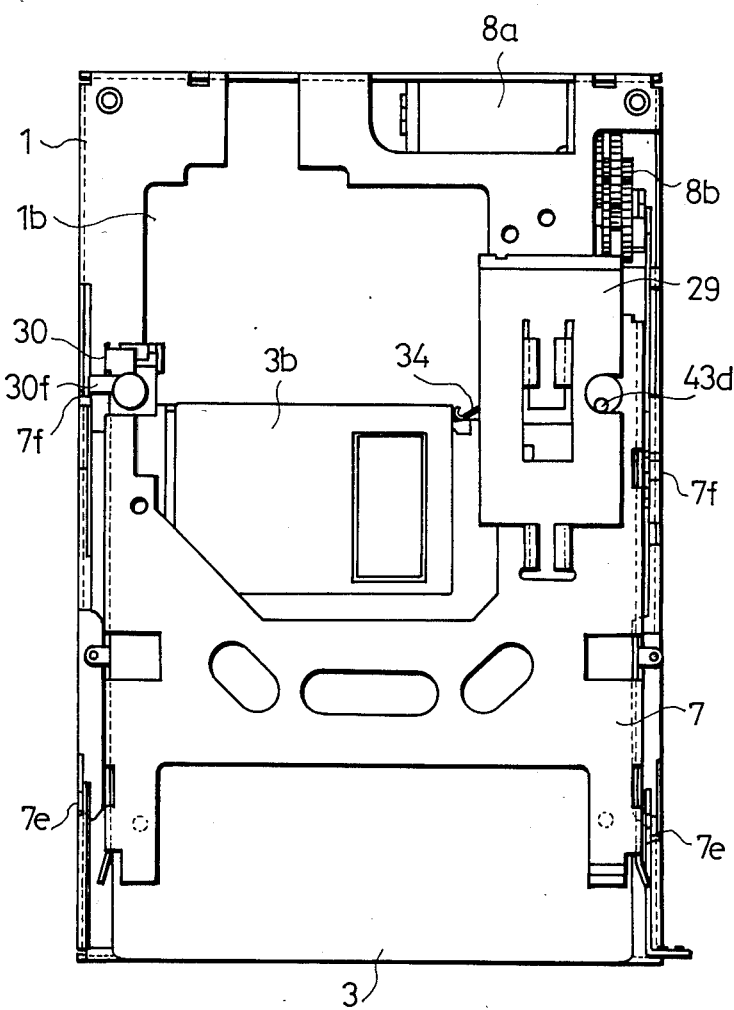
Figure 33:
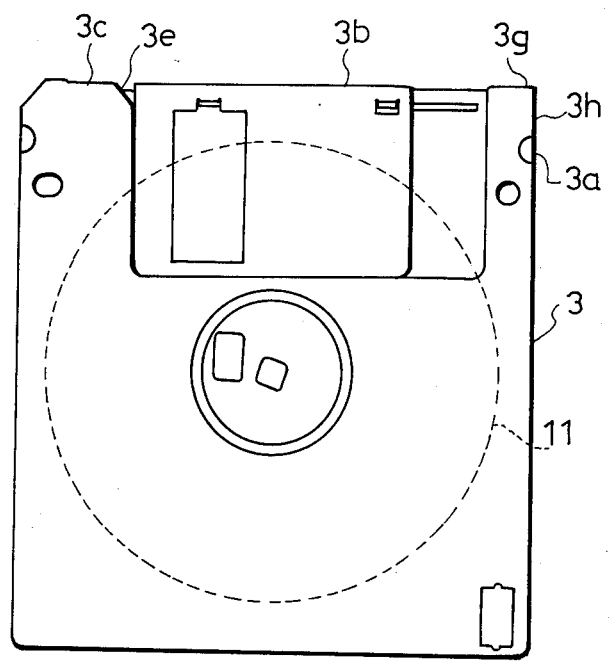
Figure 34:
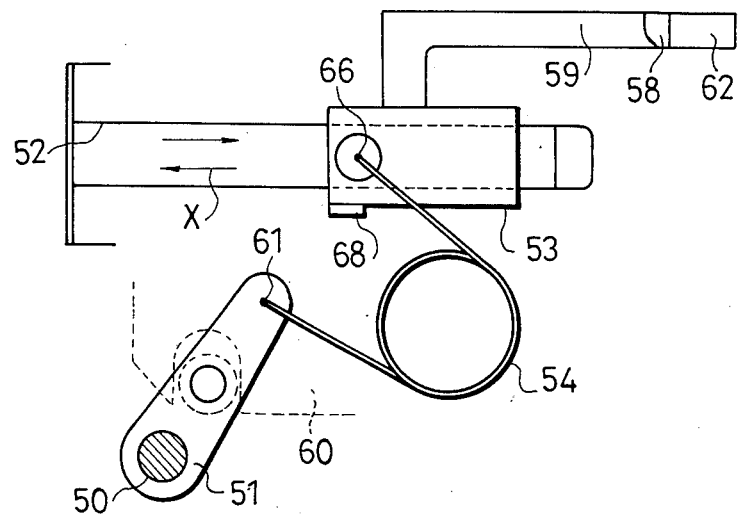
Figure 35:
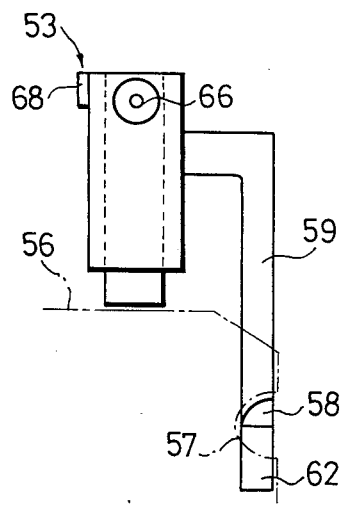
Figure 36:
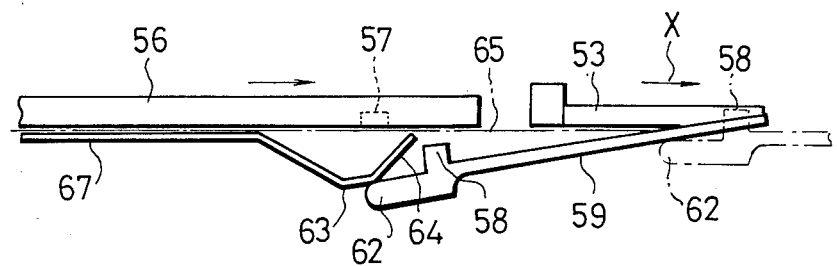
Figure 37:
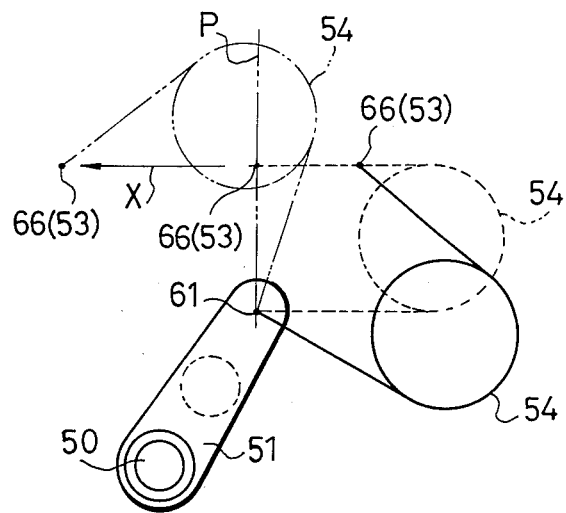

As the cartridge is pushed further into the disk driving device, the front end 3c of the cartridge 3 comes into abutment with the projection 43d of the locking lever 43 to turn the locking lever 43 counterclockwise, as viewed in FIG. 1, against the resilience of the spring 43j extended between the projection 1j and the hole 43e. After the locking lever 43 has been turned through a predetermined angle, the projection 43c of the locking lever 43 is disengaged from the projection 43a of the sliding plate 4 and the sliding plate 4 is allowed to be moved forward by the resilience of the spring 48. As the sliding plate 4 is moved forward, the holder control lever 44 is turned clockwise on the pivot shaft 44c, so that the hook 44e is moved rearward. Consequently, the holder 7 is moved rearward (in the loading direction) along the straight cam surfaces 6c of the cam surfaces 6 of the sliding plate 4 extending in parallel to the upper surface of the frame 1 by the horizontal component of the resilience of each spring 32 biasing the holder toward the turn table as illustrated in FIGS. 27 and 31. After the rollers 7e and 7f have arrived at the corresponding slope cam surfaces 6a, the holder 7 is moved obliquely downward by the effective resilience of the springs 32 as the rollers 7e and 7f roll along the slope cam surfaces 6a, respectively, to load the disk 11 on the turn table 9 as illustrated in FIGS. 28 and 32. At the same time, the holding case 12a attached to the holder 7 is lowered to locate the upper magnetic head close to the lower magnetic head 19 with the disk 11 therebetween for recording or reproducing operation. In this state, the holder 7 is located at the rearmost position, while the sliding plate 4 is located at the foremost position. Accordingly, the hook 44e of the holder control lever 44 is located at the rearmost position as illustrated in FIG. 3. During the cartridge loading operation, the projection 7h of the holder 7 is released from the hook 44e of the holder control lever 44 when the holder control lever 44 is turned to the position as shown in FIG. 2. Since the projection 7h of the holder 7 is received through the slot 4a of the sliding plate 4 and the hole 1m of the frame 1, the downward movement of the holder 7 is not obstructed by the projection 7h. The rollers 7f of the holder 7 are located and held in place at the feet of the slope cam surfaces 6a, respectively, by the resiliences of the spring s 32.

In the cartridge loading operation, the sliding plate 4 is moved by the resilience of the spring 48 extended between the frame 1 and the sliding plate 4 at an acceleration. However, since the motion of the sliding plate 4 is retarded by the damper 41 interlocked with the sliding plate 4, the operating speed of the sliding plate 4, hence the lowering speed of the holding case 12a, is limited to a moderate level, so that the the upper magnetic head is brought into contact with the surface of the disk 11 at a moderate speed. Accordingly, neither the disk 11 nor the magnetic head is damaged.

Automatic Ejecting Operation:

Now, the manner of operation of the disk driving device for the automatic ejection of the cartridge will be described hereinafter.

Upon the depression of an eject button, not shown, after the completion of the recording or reproducing operation, a control circuit, not shown, provides an eject signal to start the motor 8a. Then, the cam plate 45 attached to the side surface of the final gear 8c of the gear train 8b is turned by the motor 8a. As the cam plate 45 is turned clockwise, as viewed in FIG. 28, the roller 45a of the cam plate 45 engages the projection 6b of the sliding plate 4 to move the sliding plate 4 rearward. As the sliding plate 4 is moved rearward, the rollers 7e and 7f are raised by the slope cam surfaces 6b to the straight cam surfaces 6c of the sliding plate 4. Consequently, the holder 7 is raised to the uppermost position from the turntable 9. At the same time, the holder control lever 44 is turned counterclockwise, as viewed in FIG. 3, to bring the hook 44e into abutment with the rear side of the projection 7h. In this state, the projection 7h is located in the U-shaped recess of the hook 44e and is restrained from moving forward and rearward. As the cam plate 45 is turned further to move the sliding plate 4 further rearward, the holder 7 is moved forward by the holder control lever 44 against the resilience of the springs 32 as illustrated in FIG. 27. When the sliding plate 4 approaches the rearmost position as illustrated in FIG. 25, the locking lever 43 is returned to the initial position by the resilience of the spring 43j and engages the projection 43a of the sliding plate 4 to lock the sliding plate 4. Since the cartridge 3 is still in engagement with the projection 30a of the lever 30, the cartridge 3 is moved together with the holder 7.

When the cam plate 45 is turned further to locate the sliding plate 4 at the rearmost position as illustrated in FIG. 25, the holder 7 moves slightly forward and the projection 30f of the lever 30 comes into abutment with the rear projection 4b of the side wall 5a of the sliding plate 4 to turn the lever 30 clockwise as viewed in FIG. 29. Consequently, the the projection 30a of the lever 30 is disengaged from the recess 3a of the cartridge 3. Then, the cartridge 3 is ejected through the cartridge inlet 7d of the holder 7 by the action of the cartridge ejecting plate 34. After the cartridge 3 has been ejected, the roller 45a moves away from the projection 6b, the sliding plate 4 returns slightly forward and the holder 7 moves slightly rearward. Thus, the disk driving device is restored to the initial state for the next cartridge loading operation.

Manual Ejecting Mechanism:

When the automatic loading mechanism malfunctions due to some trouble, since the cartridge 3 is secured to the holder 7, sometimes it becomes impossible to remove the cartridge 3 from the disk driving device. In order to obviate such a trouble, a lug 6d is provided at the front end of the sliding plate 4. When the lug 6d is pushed rearward, the sliding plate 4 can be moved independently of the turning of the cam plate 45 for the above-mentioned cartridge ejecting operation.

Thus, in the embodiment described hereinbefore, the holder 7 and the cartridge 3 is moved directly by the sliding plate 4 in a predetermined range to improve the reliability of the automatic loading and ejecting operation and the forward and rearward movements of the holder 7 is regulated by the substantially U-shaped hook 44e formed in the free end of the holder control lever 44 to establish the accurate positional relation between the sliding plate 4 and the holder 7, so that the malfunction of the disk driving device is avoided. Furthermore, since the resilience of the spring 48 extended in parallel to the frame 1 on the lower surface of the frame 1 is used as the motive power for the loading and ejecting operation, the disk driving device can be constructed in a compact and thin construction.

As is apparent from what has been described hereinbefore, according to the present invention, the holder is operated through the holder control lever, which ensures the operation of the holder and improves the reliability of the disk driving device.

Although the invention has been described in its preferred form with a certain degree of particularity, it is to be understood that many variations and changes are possible in the invention without departing from the scope and spirit thereof.

What is claimed is:

1. A disk driving device which has a frame extending horizontally with a front side for receiving a cartridge having a magnetic disk therein which is inserted longitudinally in the frame toward a rear side thereof, a horizontal turntable for driving the magnetic disk of a cartridge loaded thereon, and loading means for receiving a cartridge inserted in the frame and loading it on the turntable, said loading means comprising:

holding means extending horizontally in the frame for receiving a cartridge inserted in the front side of the frame up to an abutting, innermost position in said holding means, said holding means thereupon being horizontally slidable toward the rear side of the frame by a further insertion movement of the cartridge toward a rearmost position in the frame and being movable downward onto the turntable at said rearmost position, said holding means having a guide member projecting laterally on one lateral side thereof and a projection member projecting downwardly on a bottom side thereof;

first biasing means for biasing said holding means for movement downward toward the turntable;

fixing means operative in conjunction with insertion of the cartridge in said holding means for fixing the cartridge in place in said holding means when it is inserted to said innermost position therein;

sliding means including a sliding plate oriented horizontally and extending longitudinally in the frame in parallel on said one lateral side of said holding means, said sliding plate having an upper cam surface extending along a longitudinal length thereof on which said guide member of said holding means is guided, during commencement of said further insertion movement of the cartridge and the horizontal sliding movement of said holding means, to hold said holding means in an upper position above the turntable, and an downwardly inclined cam surface at an inner position of the sliding plate on which said guide member is guided to allow said holding means to be moved downward by said first biasing means to load the cartridge to a loaded position on the turntable, said sliding means being horizontally slidable toward the front side of the frame and also having an engagement member at a rearward side thereof;

second biasing means for biasing said sliding means for movement from a rear position to a front position toward the front side of the frame;

locking means which has one part engaged with said engagement member of said sliding means for holding said sliding means in said rear position while the cartridge is inserted up to said innermost position in said holding means, and a second part which is abutted during said further insertion movement of the cartridge from said innermost position to said rearmost position in the frame to cause said one part to release said engagement member of said sliding means, whereupon said sliding means is released to be moved by said second biasing means to its front position and said guide member of said holding means is guided from said upper cam surface to said downwardly inclined cam surface of said sliding means to load the cartridge on the turntable; and a lever member mounted for pivotal movement in a horizontal plane below said holding means having one end pivotally attached to said sliding means, an intermediate portion including a guide slot in which a pivot shaft fixed to said frame is slidable engaged, and an opposite end engageable with said projection member of said holding means, wherein said opposite end of said lever member holds said holding means stably from movement during insertion of the cartridge to said innermost position therein when said sliding plate has not been released to the front position, and upon further insertion movement of the cartridge, said one end of said lever member is moved frontwardly upon release of said sliding plate toward the front position and said lever member is thereby pivoted on said pivot shaft so that said opposite end is pivoted horizontally in conjunction with movement of said projection member of said holding means toward the rear side of said frame.

2. A disk driving device according to claim 1, wherein said opposite end of said lever member is configured in a slotted U-shape with an open side such that when said locking means is abutted during said further insertion movement of the cartridge to release said sliding means, said opposite end of said lever member is pivoted to a position where said projection member becomes disengaged therefrom through said open side so as to allow said holding means and said sliding means to move apart relatively in their opposite directions.

3. A disk driving device according to claim 1, wherein said sliding means further includes a projection piece at its rearward slide which is engageable by an automatic ejecting member and by a its rear position when the cartridge is to be ejected.

* * * * *

UNITED STATES PATENT AND TRADEMARK OFFICE
CERTIFICATE OF CORRECTION

PATENT NO. : 4,786,998

DATED : November 22, 1988

INVENTOR(S) : Tadami Sugawara; Hiroshi Yoshida, Masao Okita

It is certified that error appears in the above-identified patent and that said Letters Patent is hereby corrected as shown below:

Col. 12, line 36, "slide" should be --side--.

Col. 12, line 37, after "by a", insert --manual ejecting member to allow restoration of said sliding plate to--.

Signed and Sealed this

Twenty-second Day of August, 1989

Attest:

DONALD J. QUIGG

Attesting Officer

Commissioner of Patents and Trademarks